(12) United States Patent
Gerhards et al.

(10) Patent No.: US 8,651,504 B2
(45) Date of Patent: Feb. 18, 2014

(54) TRANSVERSE LINK ON A MOTOR VEHICLE

(75) Inventors: Thomas Gerhards, Niederzier (DE); Michael Johannes Frantzen, Aachen (DE); Marc Simon, Köln (DE); Wolfgang David, Aachen (DE); Martina Beyer, Pulheim (DE); Karsten Sander, Pulheim (DE); Frank Scheper, Löningen (DE); Karsten Klostermeier, Hille (DE); Jens Wohlers, Lemförde (DE)

(73) Assignee: Ford-Werke GmbH, Köln (DE)

( * ) Notice: Subject to any disclaimer, the term of this patent is extended or adjusted under 35 U.S.C. 154(b) by 0 days.

(21) Appl. No.: 13/139,440

(22) PCT Filed: Nov. 12, 2009

(86) PCT No.: PCT/DE2009/001622
§ 371 (c)(1),
(2), (4) Date: Jul. 27, 2011

(87) PCT Pub. No.: WO2010/066226
PCT Pub. Date: Jun. 17, 2010

(65) Prior Publication Data
US 2011/0272911 A1 Nov. 10, 2011

(30) Foreign Application Priority Data
Dec. 11, 2008 (DE) .......................... 10 2008 061 833

(51) Int. Cl.
*B60G 7/00* (2006.01)
(52) U.S. Cl.
USPC .................................................. 280/124.134

(58) Field of Classification Search
USPC .................... 280/124.134, 124.135, 124.136, 280/124.153
See application file for complete search history.

(56) References Cited

U.S. PATENT DOCUMENTS

| 4,334,693 | A |   | 6/1982  | Huber .......................... 280/95 R |
|-----------|---|---|---------|------------------------------------------|
| 5,098,118 | A |   | 3/1992  | Hayashi et al. ............... 280/691    |
| 5,362,090 | A | * | 11/1994 | Takeuchi ................ 280/124.152     |
| 5,516,130 | A | * | 5/1996  | Mitchell ................. 280/124.134    |
| 5,556,119 | A | * | 9/1996  | Buchner et al. ......... 280/124.134      |
| 5,607,177 | A | * | 3/1997  | Kato ....................... 280/124.134  |
| 5,662,349 | A | * | 9/1997  | Hasshi et al. .......... 280/124.134      |
| 5,845,938 | A | * | 12/1998 | Kato ............................. 280/784 |

(Continued)

FOREIGN PATENT DOCUMENTS

| DE | 198 41 805 A1 | 3/2000 | ............... B60G 7/00 |
| DE | 103 38 625 A1 | 3/2005 | ............... B60G 7/00 |
| JP | 07119729 A    | 9/1995 | ............... F16C 7/02 |

*Primary Examiner* — Paul N Dickson
*Assistant Examiner* — Robert A Coker
(74) *Attorney, Agent, or Firm* — L.C. Begin & Associates, PLLC

(57) ABSTRACT

The invention relates to a transverse link (1) having a main body (2), which has at least one first fixing region (3) for pivotal attachment to a vehicle frame element and at least one further fixing region (6) for pivotal attachment to a hub carrier, the main body (2) having at least one wheel limb (8).
In order largely to avoid destruction of the journal connection of the transverse link to a hub carrier if the wheel hits a curbstone, for example, the proposal is to provide a transitional region (19), which is arranged between the wheel limb (8) and the further fixing region (6), the transitional region (19) being embodied in such a way that a deformation zone (21) acting in the longitudinal direction (Y) of the wheel limb (8) is formed.

15 Claims, 4 Drawing Sheets

(56) References Cited

U.S. PATENT DOCUMENTS

| | | | |
|---|---|---|---|
| 6,298,962 B1 * | 10/2001 | Kato et al. | 188/371 |
| 6,572,126 B2 | 6/2003 | Tunzini | 280/124.134 |
| 7,004,485 B2 * | 2/2006 | Spagnuolo et al. | 280/93.51 |
| 7,293,787 B2 * | 11/2007 | Nunez et al. | 280/124.134 |
| 7,665,751 B2 | 2/2010 | Kunert et al. | |
| 2005/0104315 A1 | 5/2005 | Howell et al. | 280/124.134 |

* cited by examiner

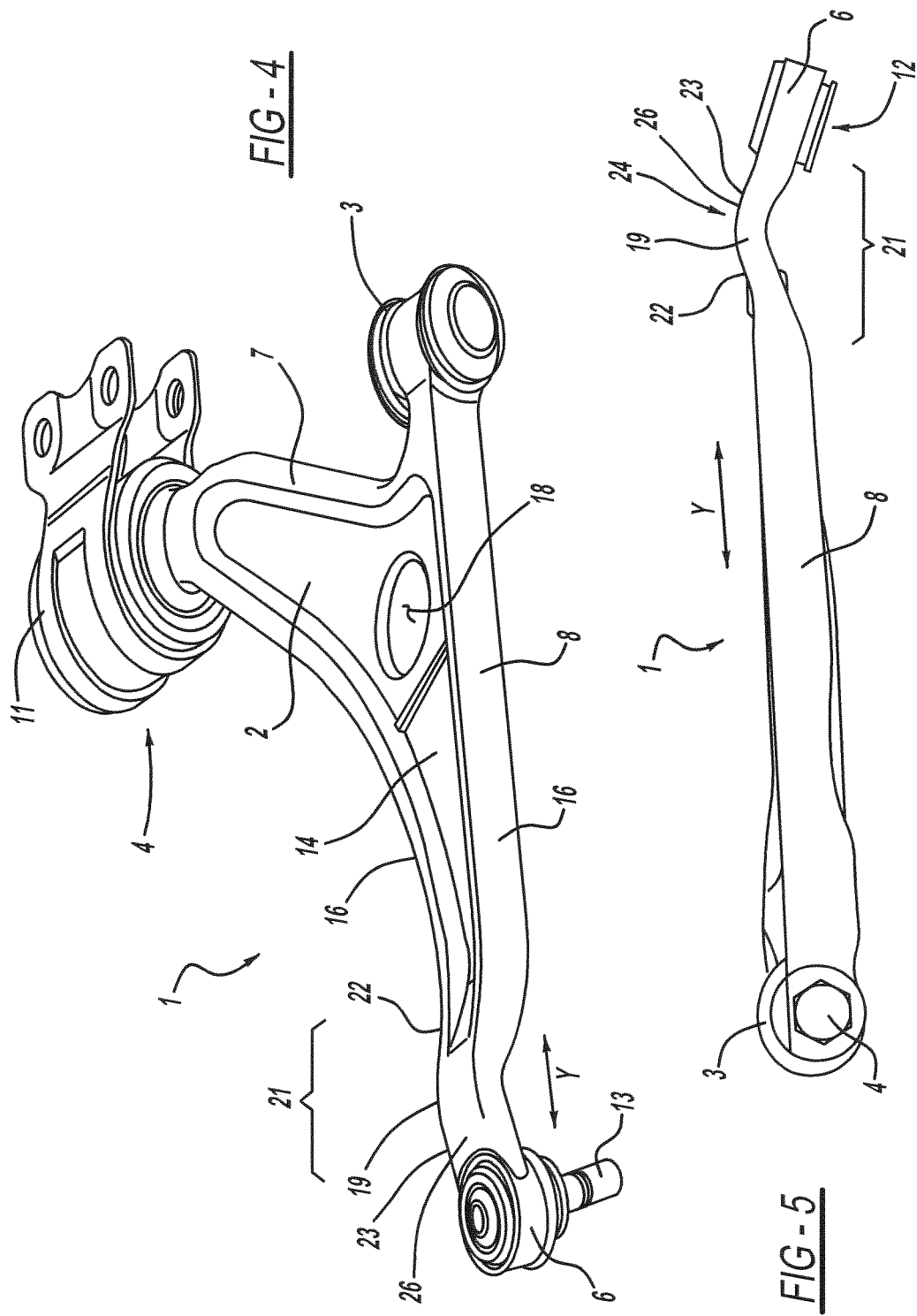

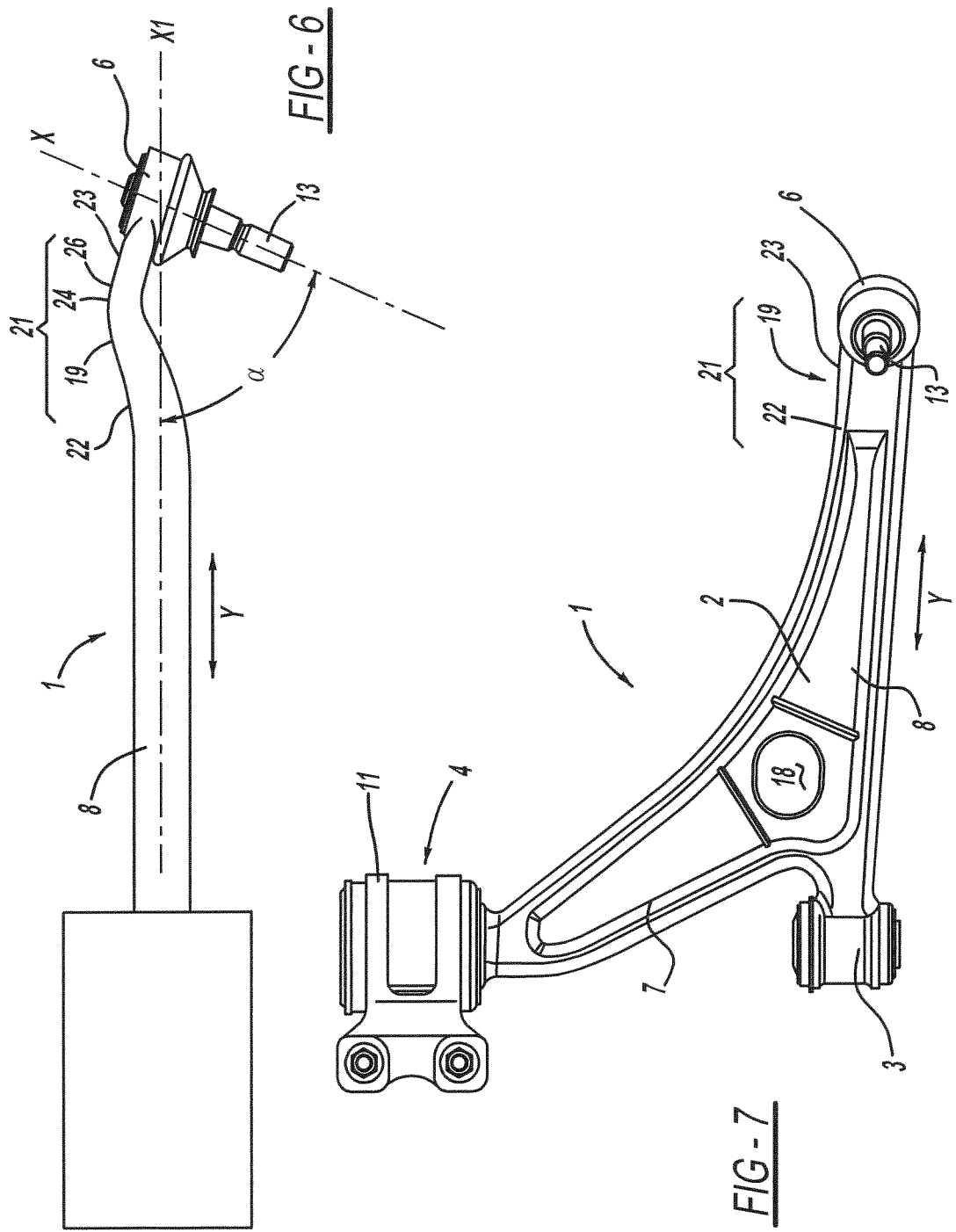

TRANSVERSE LINK ON A MOTOR VEHICLE

The invention relates to a transverse link having a main body, which has at least one first fixing region for pivotal attachment to a vehicle frame element and at least one further fixing region for pivotal attachment to a hub carrier, the main body having at least one wheel limb.

EP 1 167 092 B1 has disclosed a transverse link of a wheel suspension for a motor vehicle wheel, said link comprising an integral casting with three fixing regions. Two fixing regions are used to fix the transverse link on a chassis. The third fixing region is used for pivotal attachment to a bearing assembly of the wheel. In order to embody the transverse link with regard, inter alia, to vehicle safety considerations, EP 1 167 092 B1 proposes that at least one aperture or three apertures should be provided in a flat area. A ramp with an increasing thickness of material is provided at one of the apertures. In order to achieve a transverse link which deforms in a defined manner, one of the apertures is dumbbell-shaped. This aperture is arranged between the ramp and the fixing region for pivotal attachment to the bearing arrangement of the wheel. A second dumbbell-shaped aperture is embodied in such a way as to taper toward the first fixing region for fixing on the chassis. Thus, the transverse link in EP 1 167 092 B1 is intended to absorb impact energy and to protect other difficult-to-access components from impact energy through its deformation.

German Laid-Open Application 28 45 345 is concerned with a front wheel suspension for motor vehicles. In the event of a collision, longitudinal links pivotally attached in the region of the bulkhead can cause considerable damage to the bulkhead or even penetrate the passenger compartment, with the resulting possibility of passengers being injured by suspension components. In order to avoid this, German Laid-Open Application 28 45 345 proposes to provide an element that can be deformed with a predetermined deformation characteristic under pressure as the longitudinal link. For this purpose, offsets, notches, necks, shear joints or frictional joints, for example, could be provided on the longitudinal link in order to limit its compression strength.

DE 103 38 625 A1 discloses a transverse or diagonal link which provides articulated support for the wheels of a vehicle, on which at least one hinge arm extending between two hinge points situated at least approximately one behind the other in the direction of travel on the vehicle body is of curved design. Over at least two thirds of a distance between two hinge points, the link has a curved section. The maximum distance between the curved section and an imaginary line connecting two end points of the curved section is at least 20% of the length of the connecting line. This is intended to give a wheel suspension which assists a crash process by absorbing impact energy, without forming a block, in the event of a collision.

DE 10 2006 053 030 A1 also starts from the problem of block formation, there reportedly being a high safety risk for vehicle occupants in accidents, e.g. a frontal impact, that a running gear assembly on the vehicle will form a block and thereby prevent energy-absorbing crumpling of a front section of the vehicle in the area of running gear attachment. In this case, the rigid running gear components and the link attachments form a block which has only a little deformation capacity and often presses against a bulkhead of the passenger compartment as a single unit. As a result, too little impact energy is dissipated and, furthermore, the running gear assembly is pressed against the foot well of the passenger compartment, as a result of which there may be increased risk of injury, especially in this area. In order to achieve a transverse or diagonal link which can be compressed in an energy-absorbing manner, especially when a predefined force is exceeded. DE 10 2006 053 030 A1 proposes that a first link arm should have a deformation portion situated at the front in the direction of travel and a more rigid portion situated behind the latter in the direction of travel, the intention being that the first link arm should be deformed in an energy-absorbing manner predominantly in its deformation portion when there is a frontal crash in the longitudinal direction of the vehicle. Here, the first link arm is oriented substantially in the longitudinal direction of the vehicle and connects the front and rear hinge point for attachment of the transverse or diagonal link to the chassis, and is intended to have the ability for deformation especially in a frontal impact or collisions with curbstones.

A transverse link can be embodied with three fixing regions (three-point link), a first and a second fixing region being connected to the vehicle frame element, and the other, i.e. third, fixing region, being connected to a hub carrier via a journal connection. It has been observed that the journal connection can be destroyed if a vehicle wheel strikes a raised feature, e.g. a step-type raised feature, e.g. a curbstone, at a certain speed, whether at an angle or head on. In this case, the driver of the vehicle had the impression that the journal connection was broken or destroyed before the impact, and that this caused the accident. However, it has not been possible to dispel this impression since it is quite possible that the journal connection or journal was indeed destroyed before the collision. On the other hand, however, it is also possible that the journal connection or journal was destroyed as a result of the collision between the wheel and the curbstone given as an example.

Starting from the abovementioned problem, it is the underlying object of the invention to improve a transverse link of the type stated at the outset by simple means in such a way that destruction of the journal connection is to a large extent avoided when the wheel bumps or hits a step-type raised feature in the roadway at an angle and/or head on and/or diagonally.

According to the invention, the object is achieved by a transverse link having the features of claim 1, on which a transitional region from the wheel limb to the further fixing region is provided, the transitional region being embodied in such a way that a deformation zone acting in the longitudinal direction of the wheel limb is formed.

The invention is based on the realization that a conventionally embodied transverse link is produced, in particular, from a light metal such as aluminum, the fixing regions thereof, of which there are three for example, being arranged substantially in a common plane in an unmounted state. The transverse link is pivotally attached by its first and second fixing regions to a vehicle frame element, e.g. a subframe, and by its other, i.e. third, fixing region, is pivotally attached to a hub carrier, via a journal connection for example. This known embodiment is used primarily to ensure that the transverse link overall is embodied with a view to weight savings (light metal), with transmission of forces in a straight line from the hub carrier to the subframe used as an example being achieved.

In contrast, the invention provides a transverse link which is advantageously selectively embodied or weakened at the wheel limb thereof or in the transitional region in such a way that the transitional region, in particular, is deformed, preferably in the manner of a hump, when the wheel strikes, bumps or hits a curbstone, for example. First of all, this avoids destruction of the journal connection between the transverse link and the hub carrier or separation of the transverse link from the hub carrier since the transitional region, in particular, is deflected in the longitudinal direction of the wheel limb or is deformed in a predetermined manner, and the impact energy is reduced by the considerable proportion of the deformation energy which is absorbed in this way.

Another advantage of the advantageously embodied transverse link with its transitional region arranged between the wheel limb and the further, i.e. third, fixing region, may be regarded as the fact that destruction of the subframe too (mentioned by way of example) can be avoided through the considerable proportion of deformation energy absorbed, by which the impact energy is reduced.

In an advantageous embodiment, provision is made for the transitional region to taper continuously without a step, when viewed in cross section, to a limiting cross-sectional area from the side of said region oriented toward the wheel limb in the direction of the further, i.e. third, fixing region.

In an expedient embodiment, provision is made for the transverse link or main body thereof to be embodied integrally as a three-point link (three fixing regions) which has raised webs surrounding a flat base, with the result that the main body has an H-profile when viewed in cross section, the raised webs of the H-profile being continued into the transitional region and tapering to the limiting cross-sectional area in the direction of the further, i.e. third, fixing region. It is advantageous if the transitional region is flat, at least in one portion of the transitional region, with the raised webs that surround the base tapering relative to the base within the transitional region, at least on one side but preferably on both sides, i.e. above and below the base.

The limiting cross-sectional area is preferably dimensioned in such a way that the transverse link still has the required operating characteristics in operating conditions largely free of collisions, and that the transitional region is deformed only when a limiting load is exceeded.

In order to achieve a selective, preferably hump-like deformation of the transitional region, provision is advantageously made for the transitional region to be embodied with a curved profile such that a first web of the transitional region, said web adjoining the wheel limb, deviates from the plane of the base and a second web thereof, which adjoins the first web, is oriented so as to return in the direction of the base plane. In a preferred embodiment, the first web of the transitional region, said web adjoining the wheel limb, and the second web thereof, which adjoins the first web, are embodied in the manner of a hump, i.e. as it were in a V shape, a zenith of the transitional region between the two oppositely oriented webs being rounded. With this expedient embodiment, a predetermined deformation characteristic of the transitional region is achieved, this preferably being embodied in such a way that the transitional region is deformed in the longitudinal direction of the wheel limb when a limiting load is exceeded.

In a more expedient embodiment, provision is made for the transitional region to taper conically to the limiting cross-sectional area in the region of the first web thereof and, after reaching the limiting cross-sectional area, the transitional region is continued with this cross-sectional area, which then remains unchanged, in the direction of the third fixing region. Thus, the limiting cross-sectional area of the transitional region, which is embodied with a curve or, preferably, in a hump-like manner, is advantageously already reached in the region of the first web of the transitional region. Once the transitional region has reached its limiting cross-sectional area, provision can be made to continue the transitional region as a hollow body or, preferably, as a solid body in the direction of the further, i.e. third, fixing region. In a preferred embodiment, that portion of the transitional region which is continued in the direction of the further, i.e. third, fixing region, is made flat.

In a preferred embodiment, provision can be made for the transitional region to be embodied in such a way that the zenith of said region is oriented in the direction of a floor or upward when the transverse link is mounted on the vehicle, thus allowing the further, i.e. third, fixing region to be connected to the hub carrier from above or below by means of the journal connection.

Provision can furthermore advantageously be made for the transitional region to be embodied in such a way that the center line of the further, i.e. third, fixing region is arranged at an angle to the center line of the wheel limb, the angle between the two center lines preferably being an acute angle (<90°).

In a preferred embodiment, the transverse link is produced from a light metal, e.g. from aluminum, and has a substantially L-shaped configuration in plan view.

A transverse link in accordance with the prior art is illustrated in plan view in FIG. 1. Further advantageous embodiments of the invention are disclosed in the subclaims and in the following description of the figures, in which:

FIG. 4 shows a transverse link in a second embodiment, in a plan view,

FIG. 5 shows the transverse link from FIG. 4 in a side view,

FIG. 6 shows a detail of the transverse link from FIG. 4 in a side view with a journal, and FIG. 7 shows the transverse link from FIG. 4 in an installed position.

In the various figures, identical parts are always provided with the same reference signs, for which reason said parts are also generally described only once.

Figure 1:
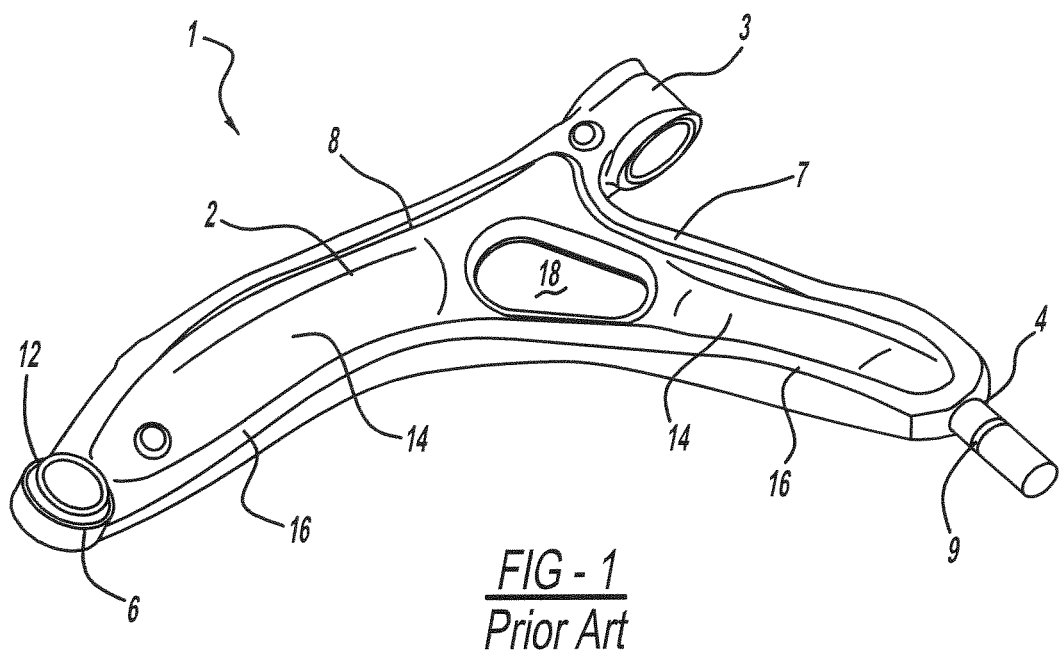

FIG. 1 shows a transverse link 1 in accordance with the prior art. The transverse link 1 has a main body 2, which has a first fixing region 3 and a second fixing region 4 for pivotal attachment to a vehicle frame element (not shown), e.g. to a subframe. The transverse link 1 furthermore has another, i.e. a third, fixing region 6 for pivotal attachment to a hub carrier (not shown). The main body 2 is substantially L-shaped, with a frame limb 7 and a wheel limb 8. The first and second fixing regions 3 and 4 are arranged on the frame limb 7. The first fixing region 3 is embodied in the manner of a sleeve, for example, the second fixing region 4 being embodied as a journal 9, for example, which is surrounded by a bearing element 11 (see FIG. 4).

The third fixing region 6 is arranged on the wheel limb 8 and forms a socket 12 for a journal 13 (see FIG. 4). By means of the journal 13, the transverse link 1 is pivotally attached to the hub carrier.

Figure 3:
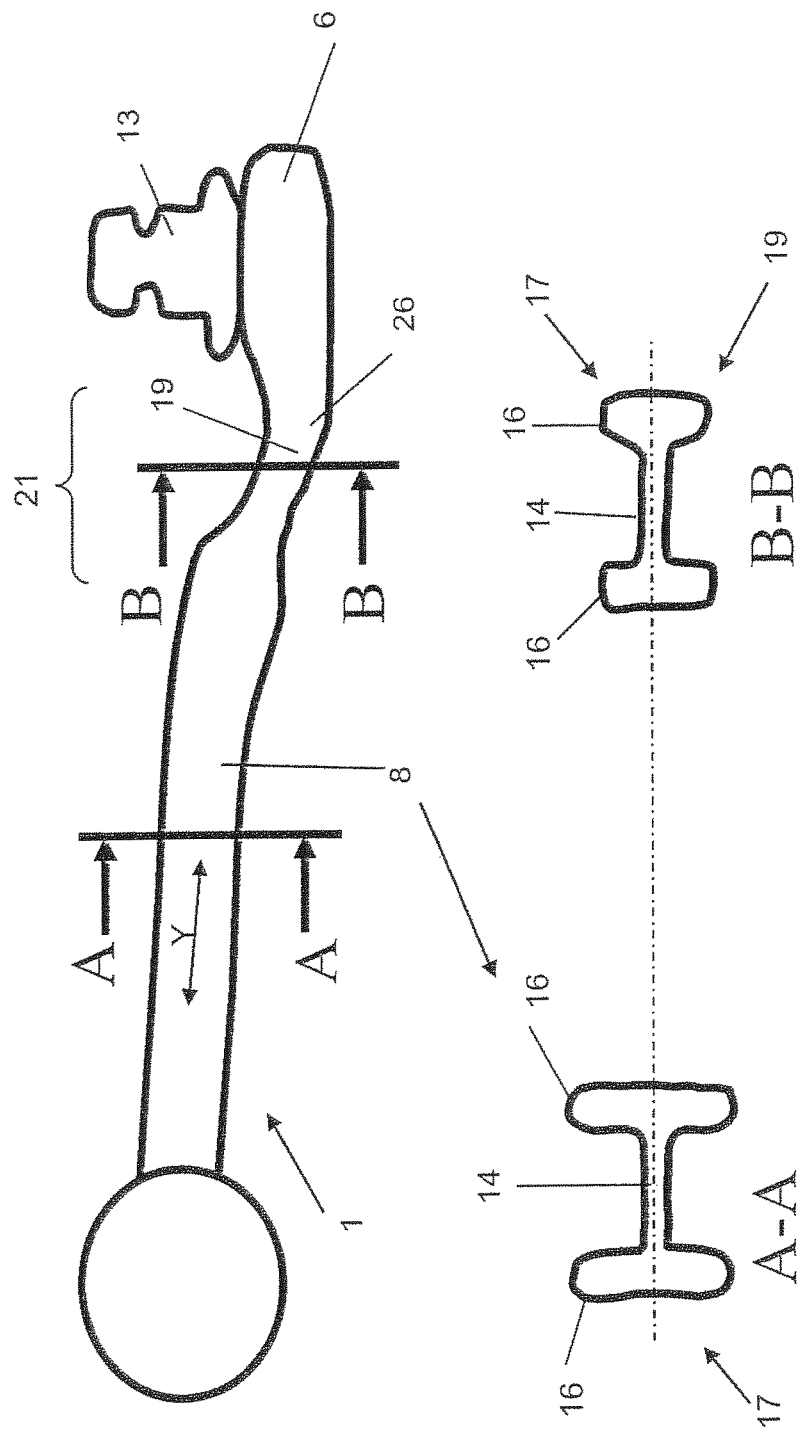
FIG. 3 shows a section through the transverse link shown in FIG. 2.

The main body 2 furthermore has a base 14, which is surrounded by raised webs 16, with the result that the main body 2 has an H-profile 17 when viewed in cross section (see FIG. 3, section A-A).

In the uninstalled position illustrated in FIG. 1, the three fixing regions 3, 4 and 6 are arranged substantially in a plane of the main body 2. Moreover, as illustrated, the main body 2 can have an aperture 18 in the base 14 thereof, for example.

As can furthermore be seen from FIG. 1, the base 14 and the raised webs 16 surrounding the latter are extended as far as the respective fixing regions 3, 4 and 6, and therefore the transverse link 1 allows transmission of forces in a straight line from the hub carrier to the vehicle frame element in the installed position.

Figure 2:
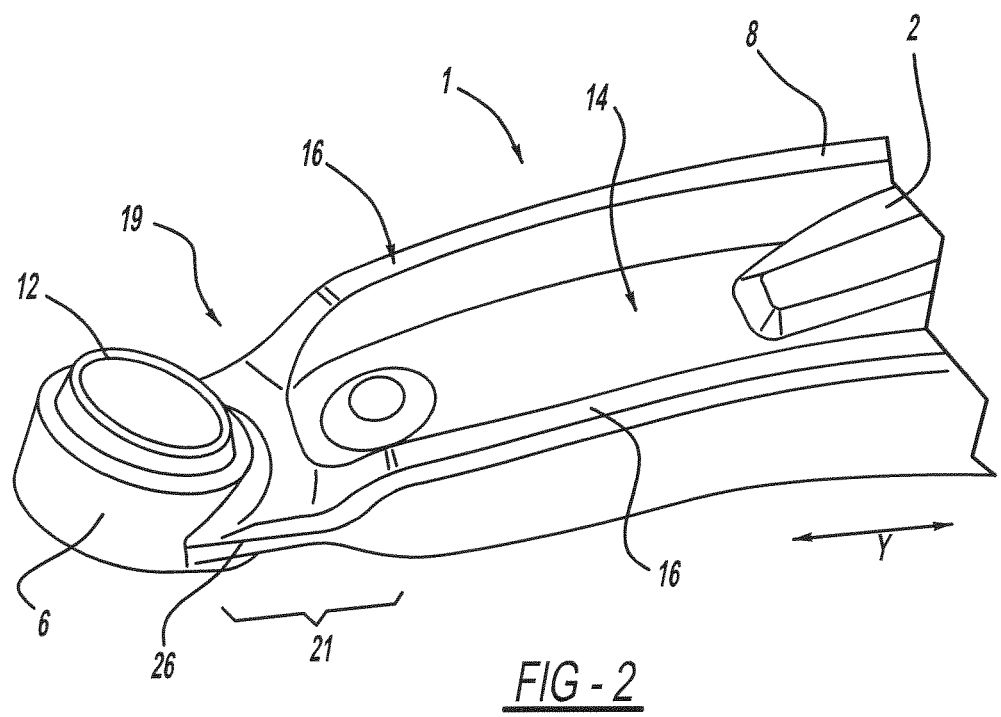
FIG. 2 shows a detail of a first embodiment of a transverse link.

FIG. 2 shows a transverse link 1 embodied in accordance with a first embodiment of the invention, only a detail of the wheel limb 8 being shown, on an enlarged scale, in FIG. 2. It is advantageous if the main body 2 has, on the wheel limb 8 thereof, a transitional region 19 arranged between the wheel limb 8 and the third fixing region 6. The transitional region 19 is produced integrally with the main body 2.

In an advantageous embodiment, the transitional region 19 is embodied in such a way that a deformation zone 21 acting in the longitudinal direction Y of the wheel limb 8 is formed.

In the illustrative embodiment shown in FIG. 2, the deformation zone 21 is formed by embodying the raised webs 16 in such a way that they taper to a limiting cross-sectional area in the direction of the third fixing region 6. In the illustrative embodiment shown in FIG. 2, the thickness of the material of the base 14 forms the limiting cross-sectional area, it being possible for the base 14 to be slightly thickened relative to the original thickness of material within the transitional region 19, this embodiment being possible if the service characteristics of the transverse link 1 are still adequate in normal operating conditions, i.e. in an operating condition largely free of collisions.

As illustrated in FIG. 3, provision is preferably made for the raised webs 16 to taper uniformly in the transitional region 19 to a fraction of the original web height on one or both sides of the base 14, i.e. above and/or below the base 14 in the plane of the drawing, as the illustrated sections A-A and B-B are intended to show. Section A-A shows an original web height, while section B-B shows a tapered web height within the transitional region 19. Relative to the original web height, the transitional region 19 has a web height that decreases without steps to about 70%, though of course this figure is only mentioned by way of example and is not intended as a restriction. Here, the thickness of the material of the base 14 remains unchanged. Portion 26 of the transitional region 19 continues the transitional region 19 with the same limiting cross-sectional area in the direction of the third fixing region 6, which is illustrated accordingly in the sectional view shown in FIG. 3. When viewed in the section in accordance with FIG. 3, the transitional region 19 is embodied as it were as a dent or cross section containing a reduced amount of material.

In the advantageous embodiment shown in FIGS. 2 and 3, the transverse link 1 provided has a predetermined selective deformation characteristic in the transitional region 19 thereof or in the deformation zone 21. If a wheel attached to the hub carrier were to bump or strike a step-type raised feature, e.g. a curbstone, head on and/or at an angle, or were hit it diagonally, the transitional region 19 would be deformed in the longitudinal direction Y of the wheel limb 8, and therefore the transitional region 19 would convert a considerable proportion of the impact energy into deformation energy. This ensures that the journal connection between the hub carrier and the transverse link 1 is not destroyed. Furthermore, it is possible in this way to keep a large proportion of the impact energy away from the vehicle frame element, and hence as it were a dual function is achieved with the advantageously embodied transverse link 1. On the one hand, the journal connection to the hub carrier and, on the other hand, the pivotal attachment of the transverse link to the vehicle frame element is protected from the impact energy, which was previously transmitted in full and in a straight line (prior art, FIG. 1). This is because, with the expedient embodiment of the transitional region 19 in accordance with the invention, the impact energy is reduced by the amount of the deformation energy absorbed here.

A further advantageous embodiment of the transverse link 1, said link having, in particular, the transitional region 19, is illustrated in FIG. 4. Here, the transitional region 19 is advantageously embodied with a curved or hump-like profile, thus forming the deformation zone 21, which acts in the longitudinal direction Y.

The transitional region 19 has a first web 22 (FIG. 5), which is adjoined integrally by a second web 23. A zenith 24, which is preferably rounded, is arranged between the two webs 22 and 23. In side view (FIG. 5), the transitional region 19 has as it were a V-shaped profile, with the first web 22 being diverted out of the plane of the base 14 and the adjoining second web 23 being returned in the direction of the plane of the base 14 in the opposite direction. In FIG. 5, the transverse link 1 is shown in an uninstalled state, for which reason the zenith 24 of the V-shaped profile of the transitional region 19 faces upward in the plane of the drawing. In FIG. 7, by contrast, the installation position of the transverse link 1 is shown, in which the zenith 24 of the transitional region 19 faces toward a floor. In the illustrative embodiment shown in FIG. 5, the two oppositely oriented webs 22 and 23 slope at the same angle, although this is intended only by way of example, not as a restriction.

As can furthermore be seen from FIGS. 4 and 5, the transitional region 19 tapers to the limiting cross-sectional area from the wheel limb 8 in the direction of the third fixing region 6. It is advantageous here that the transitional region 19 preferably already tapers without steps in the region of the first web 22 thereof to the limiting cross-sectional area and is continued in the direction of the third fixing region 6 with said cross-sectional area.

As shown in the illustrative embodiment according to FIG. 4, the second web 23 can slope at a different angle, that is to say preferably at a shallower angle, than the first web 22, as can also be seen by way of example in FIG. 6.

The raised webs 16 surrounding the base 14 are continued into the transitional region 19 but taper in the direction of the third fixing region 6. Furthermore, it is also possible for the transitional region 19 to be embodied in such a way as to taper in the direction of the third fixing region 6 in the transverse direction of said transitional region, when viewed in the plane of the drawing in FIG. 4. In the region of the first web 22, the tapering raised webs 16 project above the base 14, which continues further, a flat portion 26 of the transitional region being formed in the region of the zenith 24 and in the course of its onward progress toward the third fixing region 6. The portion 26 of the transitional region can be designed as a hollow body or, preferably, can be formed from a solid material.

The transitional region 19 with both webs 22 and 23 thereof and the portion 26 of the transitional region is preferably embodied and preferably connected to the third fixing region 6 in such a way that the center line X of the third fixing region 6 is arranged at an angle to a center line X1 of the wheel limb 8. As illustrated by way of example in FIG. 6, an angle α, preferably embodied as an acute angle (<90°), is formed between the two center lines X and X1.

The installed position of the transverse link 1 is illustrated in FIG. 7. In the installed position, the journal 13, which is accommodated in a known manner in the third fixing region 6, engages from below in the corresponding socket of the hub carrier.

The main body 2 of the transverse link 1 in accordance with the illustrative embodiments associated with FIGS. 2 to 7, is produced from a light metal, preferably from aluminum, e.g. integrally, by way of example in a casting process, although of course no restriction to this production method is intended.

The transverse link according to the illustrative embodiments associated with FIGS. 4 to 7 provides a transverse link 1 which has a predetermined selective deformation characteristic in its transitional region 19, which is preferably hump-like. If a wheel attached to the hub carrier were to bump or strike a raised feature in the roadway, a curbstone for example, e.g. head on or at an angle or hit it diagonally, the hump-like transitional region 19 would be deformed in the longitudinal direction Y of the wheel limb 8, and therefore the transitional region 19 would convert a considerable proportion of the impact energy into deformation energy. During this process, the two webs 22 and 23 would as it were fold up, and the entire transitional region 19 would be deformed in the longitudinal direction Y of the wheel limb 8. Bending of the entire deformation zone 21 or even parts thereof (19, 22, 23 or 26 for instance) is also conceivable with this advantageously designed transverse link in order to absorb the considerable proportion of the impact energy and convert it into deformation. This ensures that the journal connection between the hub carrier and the transverse link 1 is not destroyed. Furthermore, it is possible in this way to keep a large proportion of the impact energy away from the vehicle frame element, and hence as it were a dual function is achieved with the advantageously embodied transverse link 1. On the one hand, the journal connection to the hub carrier and, on the other hand, the pivotal attachment of the transverse link to the vehicle frame element, e.g. to the subframe, is protected from the impact energy, which was previously transmitted in full and in a straight line (prior art, FIG. 1). This is because, with the expedient embodiment of the transitional region 19 in accordance with the invention, the impact energy is reduced by the amount of the deformation energy absorbed here.

In the illustrative embodiments shown in FIGS. 2 to 7, a transverse link 1 having three fixing regions 3, 4 and 6 is described. Of course, it is not the intention to limit the invention to this preferred illustrative embodiment. On the contrary, the invention is also intended to include transverse links or link elements which can be connected to a hub carrier at least via a fixing region.

LIST OF REFERENCE SIGNS 1 transverse link
2 main body
3 first fixing region
4 second fixing region
5
6 third fixing region
7 frame limb
8 wheel limb
9 journal
10
11 bearing element
12 socket
13 journal
14 base
15
16 raised webs
17 H-profile
18 aperture
19 transitional region
20
21 deformation zone
22 first web of 19
23 second web of 19
24 zenith between 22 and 23
25
26 portion of transitional region
X center line of 6
X1 center line of 8
Y longitudinal direction of 8

What is claimed is:

1. A transverse link having a main body, which has at least one first fixing region for pivotal attachment to a vehicle frame element and at least one further fixing region for pivotal attachment to a hub carrier, the main body having at least one wheel limb, the transverse link comprising:
   a transitional region, which is arranged between the wheel limb and the further fixing region, the transitional region being embodied in such a way that a deformation zone acting in the longitudinal direction of the wheel limb is formed,
   wherein the transitional region tapers continuously without a step to a limiting cross-sectional area from the side of said region oriented toward the wheel limb in the direction of the further fixing region.

2. The transverse link as claimed in claim 1, wherein the main body has raised webs surrounding a flat base, with the result that the main body has an H-profile when viewed in cross section, the raised webs being continued into the transitional region and tapering to a limiting cross-sectional area in the direction of the further fixing region.

3. The transverse link as claimed in claim 1, wherein the transitional region is embodied with a curved profile, having a first web and a second web adjoining the first web, a zenith being arranged between the two webs.

4. The transverse link as claimed in claim 3, wherein the first web of the transitional region deviates from a base plane, and the adjoining second web of said region returns in the direction of the base plane.

5. The transverse link as claimed in claim 3, wherein the transitional region is of v-shaped design, the two webs thereof being oriented in opposite direction.

6. The transverse link as claimed in claim 1, wherein the transitional region is embodied in such a way that the center line of the further fixing region is arranged at an angle to a center line of the wheel limb.

7. The transverse link as claimed in claim 6, wherein the angle is an acute angle.

8. The transverse link as claimed in claim 1, which is formed from a relatively light metal.

9. The transverse link as claimed in claim 8, wherein the link is formed from aluminum.

10. The transverse link as claimed in claim 1 wherein the side of the region oriented toward the wheel limb has a relatively greater cross-sectional area and the transitional region tapers in the direction of the further fixing region to the region having the limiting cross-sectional area, the limiting cross-sectional area having a relatively smaller cross-sectional area.

11. The transverse link as claimed in claim 1 wherein the transition region has a first portion extending from the wheel limb away from a center line of the wheel limb, and a second portion connected to an end of the first portion and extending back toward the center line and toward the further fixing region.

12. The transverse link as claimed in claim 1, wherein the transitional region also tapers in a transverse direction of said transitional region.

13. A transverse link having a main body, which has at least one first fixing region for pivotal attachment to a vehicle frame element and at least one further fixing region for pivotal attachment to a hub carrier, the main body having at least one wheel limb, the transverse link comprising:
  a transitional region, which is arranged between the wheel limb and the further fixing region, the transitional region being embodied in such a way that a deformation zone acting in the longitudinal direction of the wheel limb is formed,
  wherein the transitional region tapers to a limiting cross-sectional area in the region of a first web of the transitional region and, after reaching the limiting cross-sectional area, the transitional region is continued with this cross-sectional area in the direction of the further fixing region.

14. The transverse link as claimed in claim 13, wherein the main body has raised webs surrounding a flat base, with the result that the main body has an H-profile when viewed in cross section, the raised webs being continued into the transitional region and tapering to a limiting cross-sectional area in the direction of the further fixing region.

15. A transverse link having a main body, which has at least one first fixing region for pivotal attachment to a vehicle frame element and at least one further fixing region for pivotal attachment to a hub carrier, the main body having at least one wheel limb, the transverse link comprising:
  a transitional region, which is arranged between the wheel limb and the further fixing region, the transitional region being embodied in such a way that a deformation zone acting in the longitudinal direction of the wheel limb is formed, wherein the main body has raised webs surrounding a flat base, and wherein the raised webs taper uniformly in the transitional region and in a direction toward the further fixing region, to a fraction of an original web height on one or both sides of the base.

* * * * *